(12) United States Patent
Kim et al.

(10) Patent No.: US 7,610,608 B2
(45) Date of Patent: Oct. 27, 2009

(54) DIGITAL BROADCAST SYSTEM IN PASSIVE OPTICAL NETWORK

(75) Inventors: Yongtae Kim, Daejeon (KR); Kang Bok Lee, Daejeon (KR); Heyung Sub Lee, Daejeon (KR); Hyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 925 days.

(21) Appl. No.: 10/739,236

(22) Filed: Dec. 17, 2003

(65) Prior Publication Data

US 2004/0133920 A1 Jul. 8, 2004

(30) Foreign Application Priority Data

Dec. 18, 2002 (KR) ............. 10-2002-0081380

(51) Int. Cl.
*H04N 7/173* (2006.01)
(52) U.S. Cl. ............... 725/119; 725/114; 725/116; 725/117; 725/127; 725/129; 398/71; 398/98
(58) Field of Classification Search ............... 398/71; 725/117, 119, 129
See application file for complete search history.

(56) References Cited

U.S. PATENT DOCUMENTS

| | | | | |
|---|---|---|---|---|
| 6,147,786 A * | 11/2000 | Pan | ............ | 398/1 |
| 6,229,788 B1 * | 5/2001 | Graves et al. | ............ | 370/230 |
| 6,778,550 B1 * | 8/2004 | Blahut | ............ | 370/443 |
| 6,796,555 B1 * | 9/2004 | Blahut | ............ | 370/395.1 |
| 6,970,461 B2 * | 11/2005 | Unitt et al. | ............ | 370/390 |
| 7,016,608 B1 * | 3/2006 | Ball et al. | ............ | 398/71 |
| 7,031,343 B1 * | 4/2006 | Kuo et al. | ............ | 370/473 |
| 2002/0067729 A1 * | 6/2002 | Fukuda et al. | ......... | 370/395.21 |
| 2002/0152471 A1 * | 10/2002 | De Haas | ............ | 725/95 |
| 2003/0007724 A1 * | 1/2003 | Gummalla et al. | ......... | 385/24 |
| 2003/0048801 A1 * | 3/2003 | Sala et al. | ............ | 370/445 |
| 2003/0152389 A1 * | 8/2003 | Sala et al. | ............ | 398/98 |
| 2004/0052274 A1 * | 3/2004 | Wang et al. | ............ | 370/468 |
| 2004/0161236 A1 * | 8/2004 | Koh et al. | ............ | 398/75 |
| 2004/0184806 A1 * | 9/2004 | Lee et al. | ............ | 398/79 |
| 2004/0240466 A1 * | 12/2004 | Unitt et al. | ............ | 370/461 |
| 2005/0058118 A1 * | 3/2005 | Davis et al. | ............ | 370/351 |
| 2007/0274717 A1 * | 11/2007 | Xu et al. | ............ | 398/58 |

FOREIGN PATENT DOCUMENTS

| | | |
|---|---|---|
| KR | 10-0176082 | 11/1998 |
| KR | 1999-0035422 | 5/1999 |

* cited by examiner

*Primary Examiner*—Christopher Kelley
*Assistant Examiner*—Farzana Hossain
(74) *Attorney, Agent, or Firm*—Blakely, Sokoloff, Taylor & Zafman LLP

(57) ABSTRACT

Provided is a digital broadcast system that receives digital broadcast services on a passive optical network (PON). The data separator separates a signal input thereinto from the outside into an Ethernet frame for data service and an Ethernet frame for digital broadcast service. The Ethernet switch transmits the Ethernet frame for data service to an optical network terminal (ONT) provided in the user's home according to header information of the Ethernet frame for data service. The channel request processor receives the user's channel selection request information and user identification (ID) information from the ONT. The digital broadcast processor transmits the Ethernet frame for digital broadcast service, corresponding to the digital broadcast channel selected by the user, to the user's ONT, by using a part of bandwidth assigned for an existing line.

13 Claims, 5 Drawing Sheets

DIGITAL BROADCAST SYSTEM IN PASSIVE OPTICAL NETWORK

BACKGROUND OF THE INVENTION

This application claims the priority of Korean Patent Application No. 2002-81380, filed on Dec. 18, 2002, in the Korean Intellectual Property Office, the disclosure of which is incorporated herein in its entirety by reference.

1. Field of the Invention

The present invention relates to a digital broadcast system, and more particularly, to a digital broadcast system that receives digital broadcast services on a passive optical network (PON).

2. Description of the Related Art

FIG. 1 is a diagram illustrating a cable TV network 101. The cable TV network 101 is generally used for providing cable TV programs through a cable TV 111 and a cable TV converter 121. However, as shown in FIG. 1, a variety of devices, including a telephone device 112, a telephone terminal 122, a cable router 113, a cable modem 123, a video-on-demand (VOD) server 114, a VOD converter 124, a high availability (HA) server 115, and an HA terminal 125, can be further connected to the cable TV network 101 so as to provide various services, such as Internet services, VOD services, and telephone services and thus make the utmost use of a broad bandwidth provided by the cable TV network 101.

So far, a variety of high-speed Internet services have been provided using either a technique of accessing the Internet with the help of such a conventional cable TV network as the one shown in FIG. 1 or a technique of providing Internet services to predetermined dense areas in terms of the number of users by using an internet network. The former technique, however, has disadvantages in terms of providing data services. On the contrary, the latter technique has disadvantages in terms of providing broadcast services. Therefore, a brand-new digital broadcast technique, which can successfully provide digital broadcast services using a conventional network and can also provide data services of good quality to uses, is necessary.

SUMMARY OF THE INVENTION

The present invention provides a digital broadcast system and an optical network unit (ONU) for the digital broadcast system. The digital broadcast system receives digital broadcast programs using a conventional Ethernet network and an Ethernet passive optical network (E-PON) and enables the ONU to provide digital broadcast programs to user devices. The digital broadcast system does not require dedicated cables for broadcast to be further installed or rearranged and can simplify the structure of set-top boxes (STBs).

A digital broadcast system, comprising:
  a digital broadcast output unit which transmits a plurality of digital broadcast channels that has been multiplexed and encrypted in an Ethernet frame form, via an optical line terminal (OLT) on an Ethernet passive optical network (E-PON); and
  a plurality of optical network units (ONUs) which provide one of the digital broadcast channels to a user in response to a user selection, by using a part of bandwidth assigned for an existing line.

According to an aspect of the present invention, there is provided an optical network unit (ONU), including a data separator, an Ethernet switch, a channel request processor, and a digital broadcast processor. The data separator separates a signal input thereinto from the outside into an Ethernet frame for data service and an Ethernet frame for digital broadcast service. The Ethernet switch transmits the Ethernet frame for data service to an optical network terminal (ONT) provided in the user's home according to header information of the Ethernet frame for data service. The channel request processor receives the user's channel selection request information and user identification (ID) information from the ONT. The digital broadcast processor transmits the Ethernet frame for digital broadcast service, corresponding to the digital broadcast channel selected by the user, to the user's ONT, by using a part of bandwidth assigned for an existing line.

According to another aspect of the present invention, there is provided an optical network unit (ONU), including a data separator, an Ethernet switch, a channel request processor, and a digital broadcast processor. The data separator separates a signal input thereinto from the outside into an Ethernet frame for data service and an Ethernet frame for digital broadcast service. The Ethernet switch transmits the Ethernet frame for data service to an optical network terminal (ONT) provided in the user's home according to header information of the Ethernet frame for data service. The channel request processor receives the user's channel selection request information and user identification (ID) information from the ONT. The digital broadcast processor transmits the Ethernet frame for digital broadcast service, corresponding to the digital broadcast channel selected by the user, to the user's ONT, by using a part of bandwidth assigned for an existing line.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in greater detail with reference to the accompanying drawings in which preferred embodiments of the invention are shown.

Figure 1:
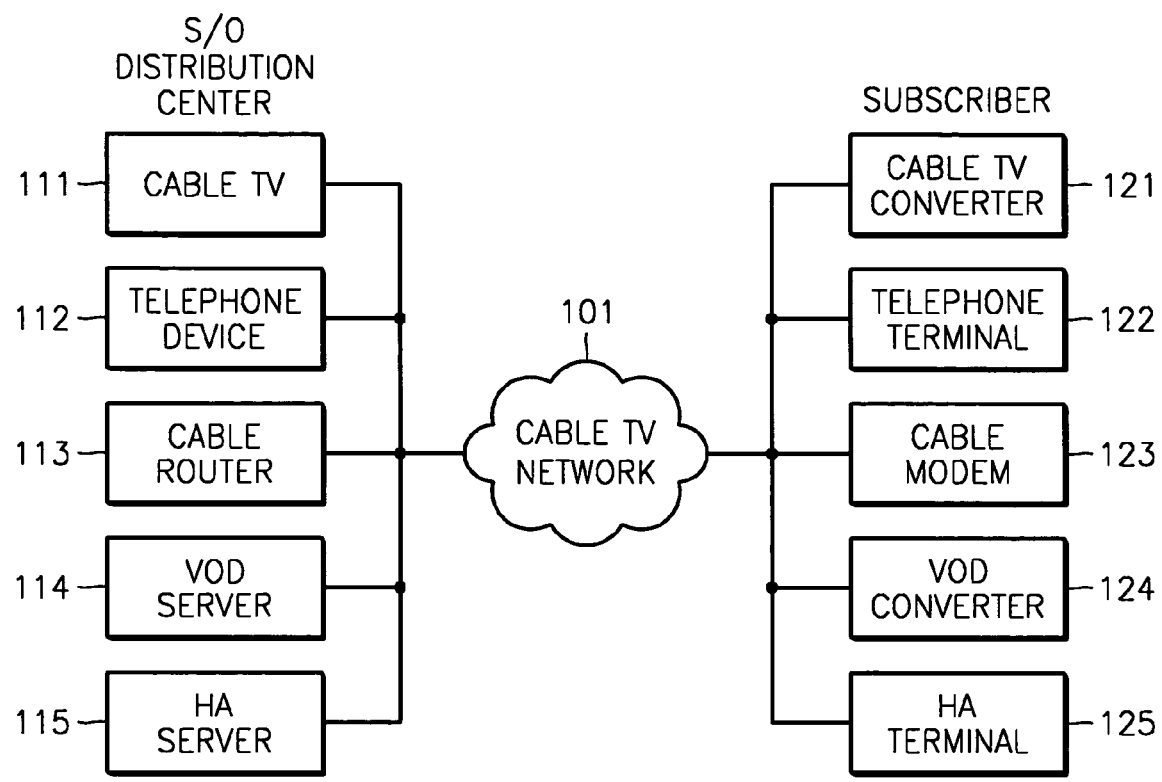
FIG. 1 is a diagram illustrating a conventional cable TV network.
Figure 2:
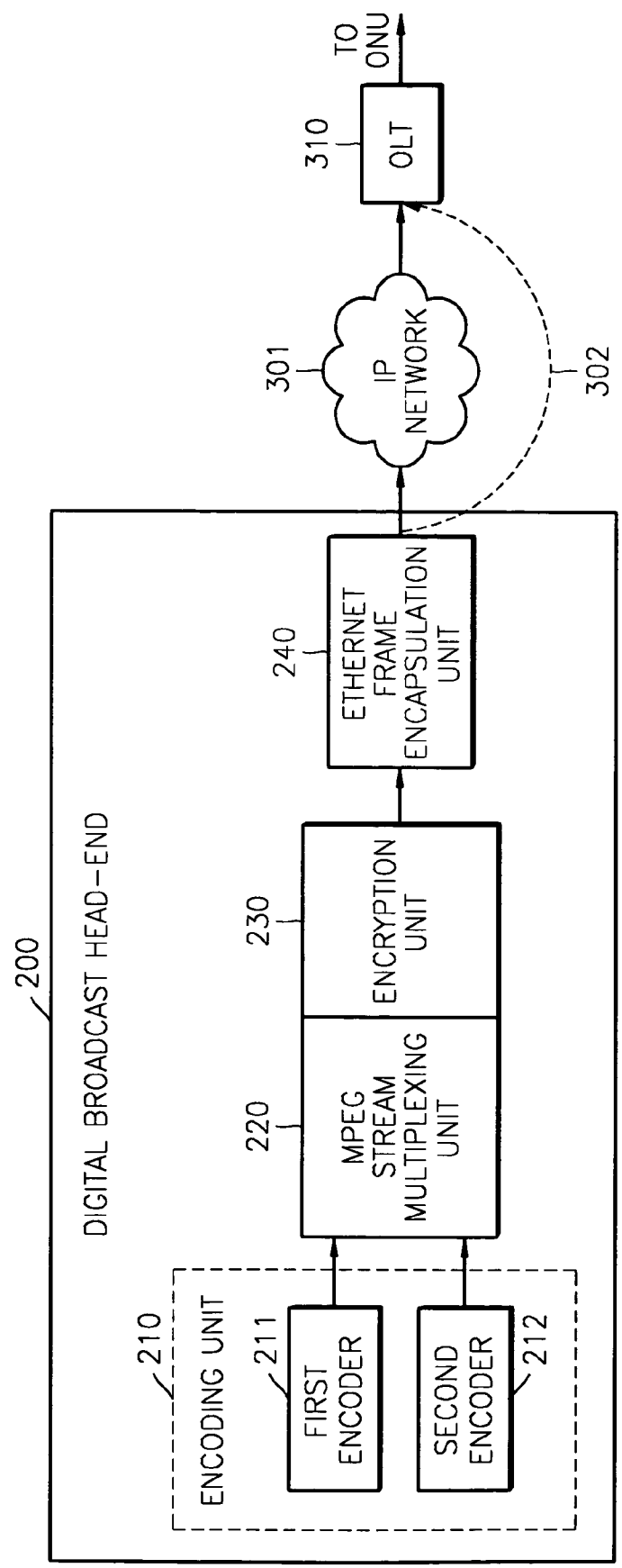
FIG. 2 is a block diagram of a digital broadcast head-end for an optical network unit (ONU) according to a preferred embodiment of the present invention.

FIG. 2 is a block diagram of a digital broadcast head-end 200 for an optical network unit (ONU) according to a preferred embodiment of the present invention. Referring to FIG. 2, the digital broadcast head-end 200 needs to encapsulate a Moving Picture Experts Group (MPEG) frame into an Ethernet frame in order to provide digital broadcast. For this, the digital broadcast head-end 200 includes an encoding unit 210, an MPEG stream multiplexing unit 220, an encryption unit 230, and an Ethernet frame encapsulation unit 240. The encoding unit 210 includes a plurality of encoders 211 and 212.

The encoding unit 210 encodes real-time content or a broadcast into an MPEG data stream using the encoders 211 and 212. The MPEG-stream multiplexing unit 220 multiplexes the MPEG data stream provided by the encoding unit 210, and the encryption unit 230 encrypts the multiplexed MPEG data stream. The Ethernet frame encapsulation unit 240 encapsulates the encrypted MPEG data stream into an Ethernet frame.

The Ethernet frame, which is for digital broadcast service, is transmitted to an optical line terminal (OLT) 310, which is an upper layer on an Ethernet passive optical network (E-PON), via a conventional Internet Protocol (IP) network 301 or via a leased line 302. An access network structure, shown in FIG. 3, can be used for interfacing between the OLT 310 and user devices.

Figure 3:
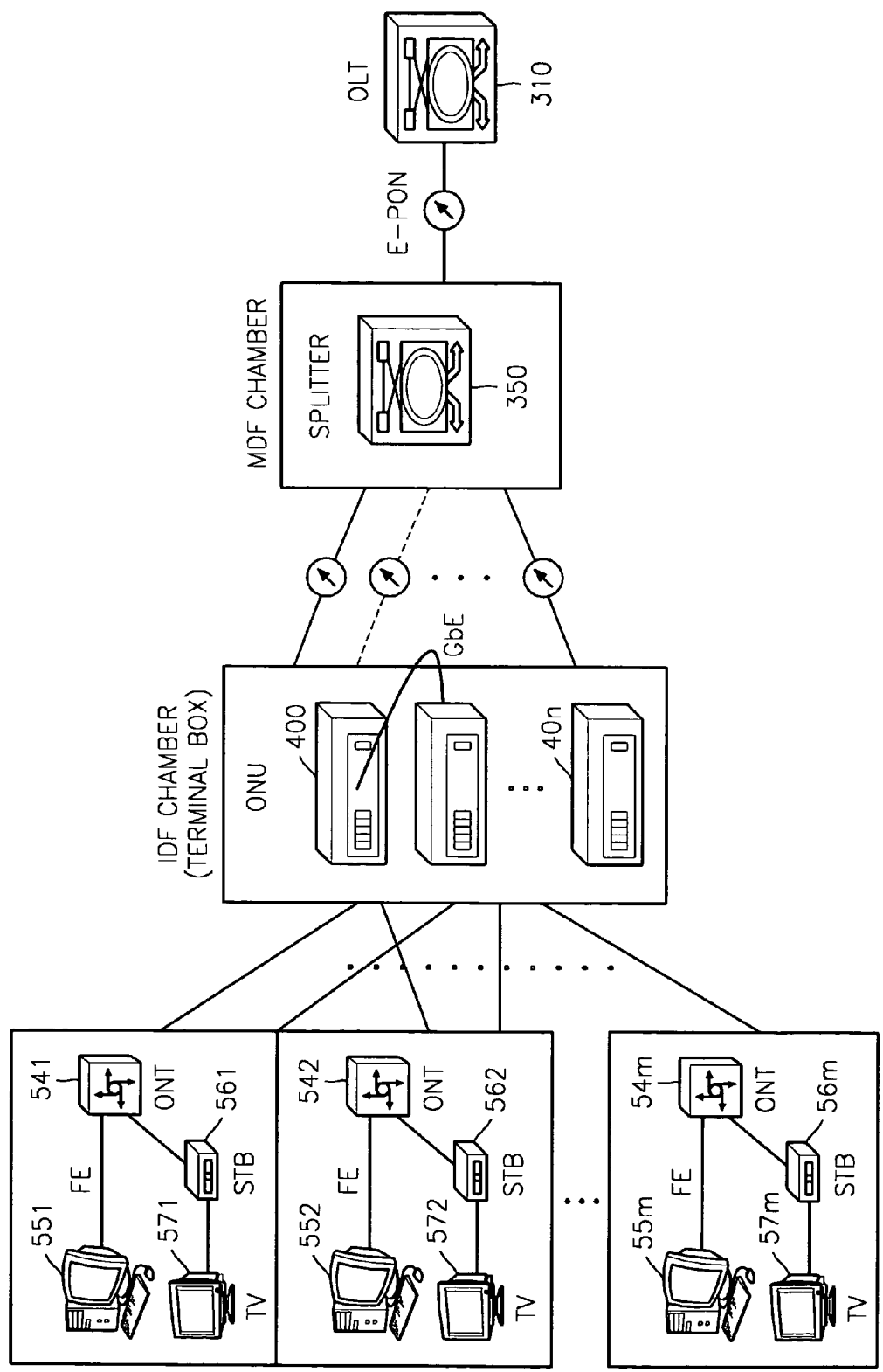
FIG. 3 is a diagram illustrating an access network according to a preferred embodiment of the present invention.

FIG. 3 is a diagram illustrating an access network according to a preferred embodiment of the present invention. Referring to FIG. 3, the OLT 310 interfaces with user devices via a splitter 350 and a plurality of optical network units 400 through 40n.

The OLT 310 connected to a user device via an E-PON performs not only an Ethernet frame interface for digital broadcast service but also an Ethernet frame interface for data service. In order to transmit the Ethernet frame for digital broadcast service via the IP network 301 of FIG. 2, it is necessary to adopt a technique capable of guaranteeing quality of service (QoS), such as a multi-protocol label switching (MPLS) technique.

The splitter 350 receives a signal from the OLT 310, makes a plurality of copies of the received signal, and broadcasts those copies to the plurality of ONUs 400 through 40n. The Ethernet frame for digital broadcast service and the Ethernet frame for data service are transmitted to each of the ONUs 400 through 40n via the same optical cable but using different frequency ranges, a process which is based on a wavelength division multiplexing (WDM) technique provided by the E-PON. The splitter 350 is a device for splitting an input signal into two or more signals having different frequency ranges. The splitter 350 may also be used to assemble signals, input from different devices, into a single signal.

The ONUs 400 through 40n are connected to user modems, i.e., optical network terminals (ONTs) 541, 542, . . . , 54m, respectively so that they can receive the Ethernet frame for data service as well as the Ethernet frame for digital broadcast service. According to the present invention, digital broadcast transmission between the ONUs 400 through 40n to the ONTs 541 through 54m is carried out not on an all-channels-at-once basis but on a channel-by-channel basis according to user selection. Therefore, part of bandwidth provided by existing lines can be reserved for digital broadcast service without adopting high-priced wavelength division multiplexing (WDM) techniques or installing new lines connecting the ONUs 400 through 40n and the ONTs 541 through 54m.

Each of the ONTs 541 through 54m, respectively provided in homes, converts an optical signal transmitted from a corresponding ONU into high-speed Ethernet frame, provides the Ethernet frame to a corresponding personal computer (PC) 561 through 56m for data service, or provides the Ethernet frame to a corresponding TV 571 through 57m via a corresponding set-top box 551 through 55m for digital broadcast service.

Figure 4:
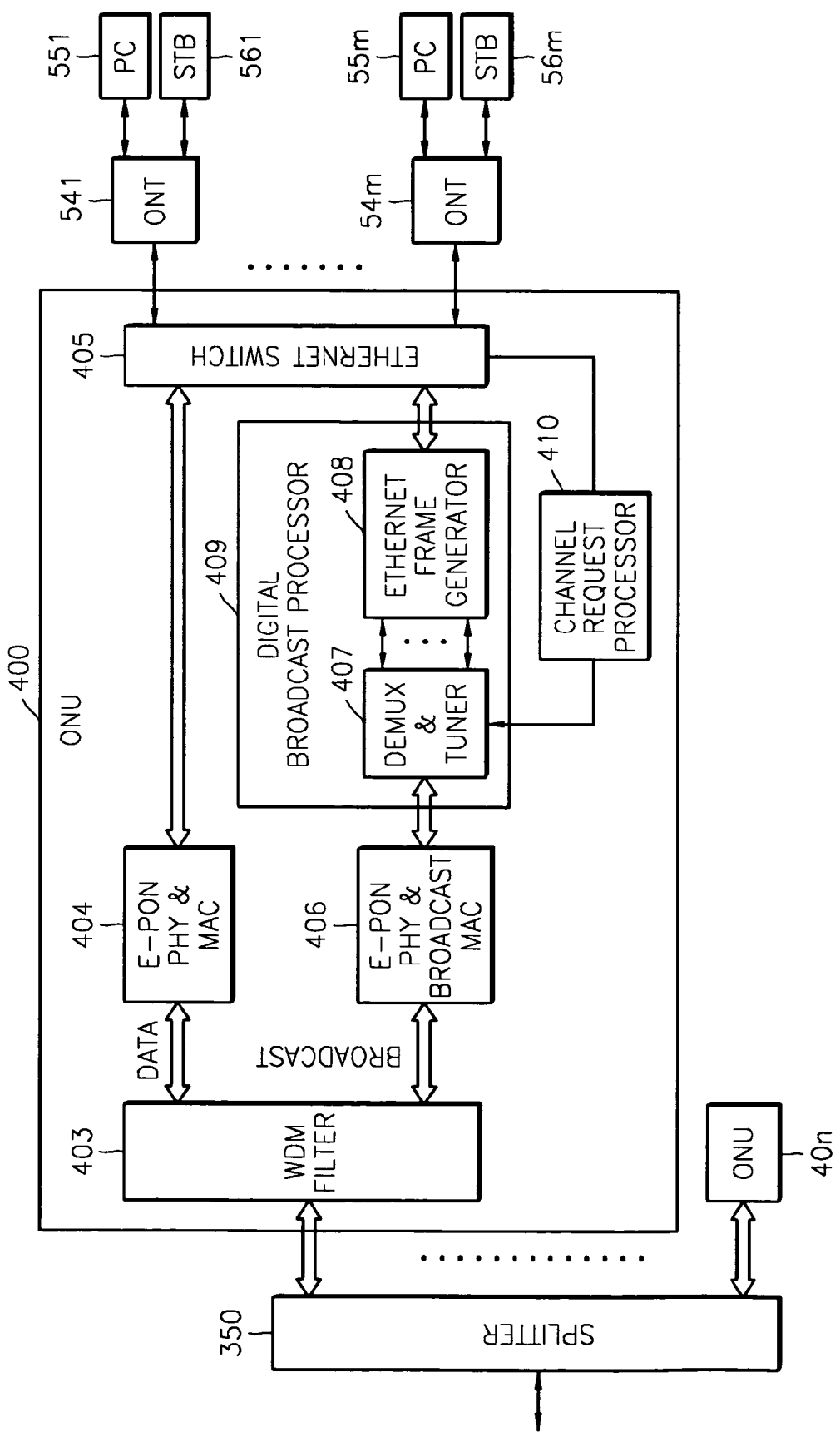
FIG. 4 is a block diagram of a digital broadcast system according to a preferred embodiment of the present invention.

FIG. 4 is a block diagram of a digital broadcast system according to a preferred embodiment of the present invention. More specifically, FIG. 4 illustrates an ONU 400, which upwardly interfaces a WDM-based E-PON and downwardly interfaces an Ethernet network.

Referring to FIG. 4, the ONU 400 includes a WDM filter 403, an E-PON physical layer and medium access protocol (MAC) 404, an Ethernet switch 405, an E-PON physical layer and MAC for broadcast 406, a digital broadcast processor 409, and a channel request processor 410. The ONU 400 serves as an interface for the splitter 350 and the OLT 310, which transmit the Ethernet frame for digital broadcast service and the Ethernet frame for data service, having different wavelengths, via a single line.

A signal, transmitted from the OLT 310, is copied into a plurality of identical signals via the splitter 350, and the identical signals are simultaneously input into the ONUs 400 through 40n, respectively. Each of the ONUs 400 through 40n or the ONU 400 of FIG. 4, in particular, divides the signal input thereinto into an Ethernet frame for data service and an Ethernet frame for digital broadcast service.

The Ethernet frame for data service is input into the Ethernet switch 405 via the E-PON physical layer and MAC 404. The Ethernet switch 405 transmits the Ethernet frame input thereinto to a predetermined ONT by carrying out switching according to header information of the Ethernet frame for data service. The corresponding ONT 541 through 54m transmits the Ethernet frame input from the ONU 400 to a corresponding PC 551 through 55m, thus enabling the providing of a data service to a user.

The Ethernet frame for digital broadcast service is converted into an MPEG stream via the E-PON physical layer and MAC 404, and the MPEG stream is input into the digital broadcast processor 409. The digital broadcast processor 409 includes a demultiplexer-and-tuner 407 and an Ethernet frame generator 408, the demultiplexer-and-tuner 407 demultiplexes a plurality of Ethernet frames for digital broadcast service of different channels, and transmits the demultiplexed Ethernet frame corresponding to a channel selected by a user to one of ports defined in the ONTs in response to a channel selection signal input from the channel request processor 410. The Ethernet frame generator 408 encapsulates the MPEG stream, input from the demultiplexer-and-tuner 407, thus generating an Ethernet frame having the user's address as a destination address. The Ethernet Frame for digital broadcast service is input into a predetermined ONT 541 through 54m via the Ethernet switch 405. The corresponding ONT 541 through 54m extracts an MPEG stream from the Ethernet frame for digital broadcast service input via the Ethernet switch 405 and transmits the extracted MPEG stream to a corresponding set-top box 561 through 56m, thus enabling the providing of a digital broadcast service to the user.

Figure 5:
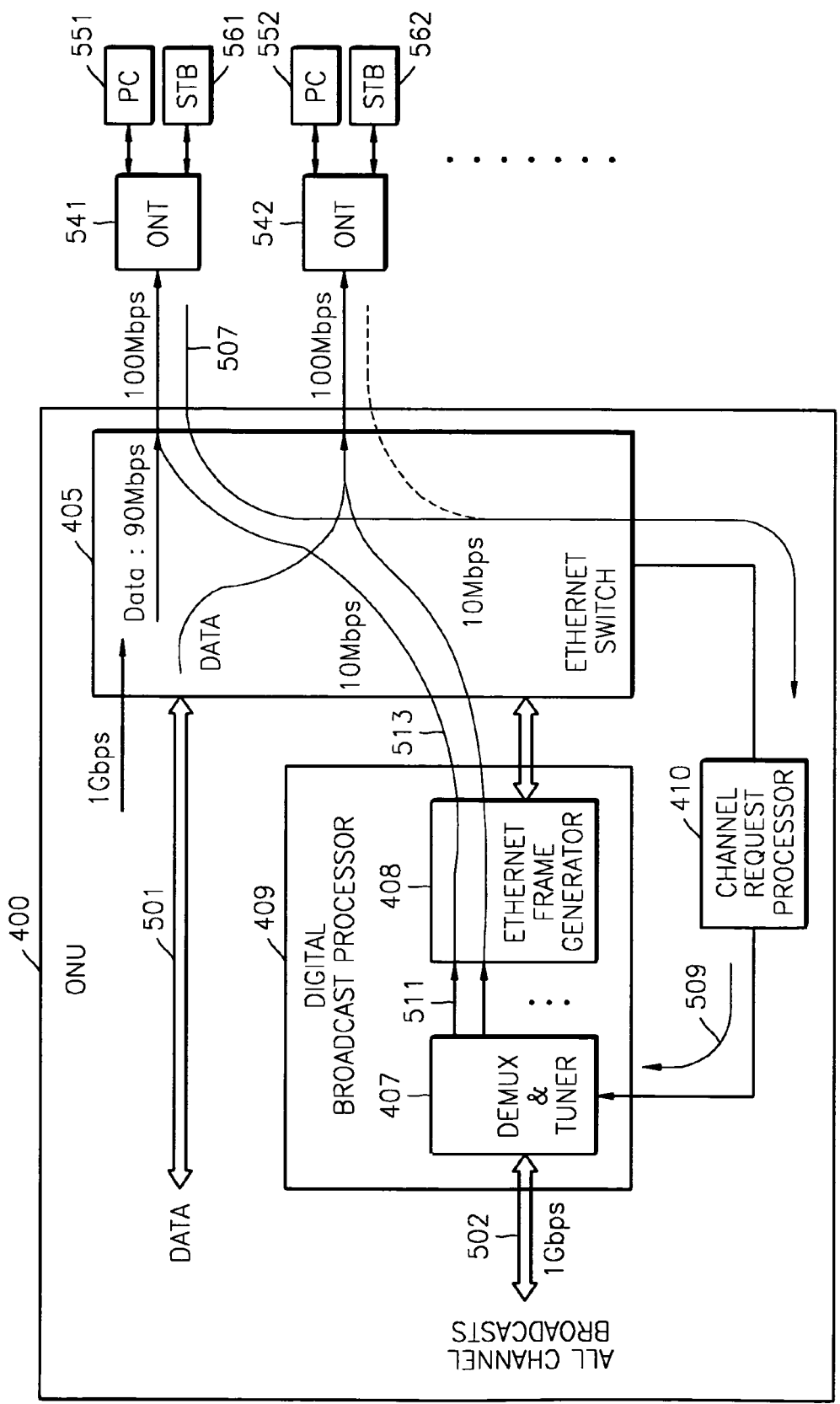
FIG. 5 is a diagram illustrating the procedure of a digital broadcast service carried out by an optical network unit shown in FIG. 4 and bandwidths allotted for the digital broadcast.

FIG. 5 is a diagram illustrating the procedure of a digital broadcast service carried out by an optical network unit shown in FIG. 4 and bandwidths allotted for the digital broadcast. In FIG. 5, reference numeral 501 represents inputting of an Ethernet frame for data service, which has been interfaced between the splitter 350 and the ONU 400 in the OLT interface on the EPON, and reference numeral 502 represents inputting of an Ethernet frame for digital broadcast service.

For example, a typical Ethernet switch chip, having a gigabit port that upwardly interfaces the OLT 310 and a 100-Mbps bi-directional port that downwardly interfaces a user, can be used as the Ethernet switch 405. A bandwidth of 100 Mbps, including a bandwidth of 90 Mbps provided for data service and a bandwidth of 10 Mbps provided for digital broadcast service, is allotted to the Ethernet switch 405 and each of the ONTs 541 through 54m. Switching operations at the Ethernet switch 405 enable data transmission between an ONT designated by the header of the Ethernet frame 501 for data service and a corresponding PC using a bandwidth of up to 90 Mbps.

During this process, when a user hits a button on a remote controller to select a channel and watch a digital broadcast program on the channel, a set-top box, provided at the user's ONT, transmits information of the selected channel to the channel request processor 410 along a data path 507. The channel request processor 410 then analyses the message sent by the corresponding set-top box along the data path 507 and informs the demultiplexer-and tuner 407 of the digital broadcast processor 409 of the user's ID and the channel information. The Ethernet switch 405 is supposed to treat data transmitted along the data path 507 as a first priority.

The demultiplexer-and-tuner 407 demultiplexes input MPEG streams for all channels and transmits the demultiplexed MPEG stream, corresponding to the selected channel, to a port allotted to the user's ONU. In FIG. 5, reference numeral 511 represents a port allotted to each of the ONTs 541 through 54*m*. The MPEG stream input into the Ethernet frame generator 408 via the port 511 is converted into an Ethernet frame having the address of the ONT designated by the user ID as a destination address. The Ethernet frame is input into the Ethernet switch 405 and the corresponding ONT along a data path 513.

When the Ethernet frame is input into the user's ONU along the data path 513, the user's ONU extracts an MPEG stream from the input Ethernet frame and transmits the extracted MPEG stream to the user's set-top box. Then, the corresponding set-top box decrypts the MPEG stream, which is password-protected, produces the decrypted MPEG stream, and transmits images to the user's digital TV.

Since a bandwidth required to transmit a digital broadcast program from the ONU 400 and each of the ONTs 541 through 54*m* corresponds to a bandwidth of a single channel, it can be allotted to 10 Mbps. Therefore, the above-described data service and digital broadcast service can be successfully provided using a bandwidth of 100 Mbps allotted in between the Ethernet switch 405 and each of the ONTs 541 through 54*m*.

As described above, in the present invention, digital broadcast programs are transmitted from the ONU 400 to each of the ONTs 541 through 54*m* not on an all-channels-at-once basis but on a channel-by-channel basis by user selection. Therefore, without further installing new lines connecting between the ONU 400 and the ONTs 541 through 54*m* or adopting expensive WDM techniques, part of bandwidth provided by existing lines can be reserved for digital broadcast transmission. In addition, since channel setting, which used to be carried out by the digital set-top boxes 561 through 56*m*, is carried out by the channel request processor 410 of the ONU 400, shown in FIG. 4, the structure of the digital set-top boxes 561 through 56*m* can be simplified. Furthermore, in the present invention, digital broadcast for all channels is terminated at the ONU 400 instead of ONTs 541 through 54*m*. Therefore, it is possible to cut costs and reduce bandwidth that is allotted in between the ONU and each of the ONTs 541 through 54*m* and reserved for digital broadcast While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital broadcast system, comprising:
    a digital broadcast output unit which transmits a plurality of digital broadcast channels that has been multiplexed and encrypted in an Ethernet frame form, via an optical line terminal (OLT) on an Ethernet passive optical network (E-PON); and
    a plurality of optical network units (ONUs) which provide one of the digital broadcast channels to a user in response to a user channel selection, by using a part of bandwidth assigned for an existing line, wherein each ONU comprises:
    a digital broadcast processor which receives an MPEG stream containing all of the digital broadcast channels transmitted from the digital broadcast output unit over the E-PON, demultiplexes a plurality of Ethernet frames corresponding to all of the of the digital broadcast channels, and transmits, in response to the user's channel selection, one of the demultiplexed Ethernet frames that is corresponding to the digital broadcast channel selected by the user, to the user's optical network terminal (ONT); and
    an Ethernet switch to transmit the Ethernet frame for the digital broadcast channel to an ONT provided at a location of the user, wherein the digital broadcast processor further comprises:
    an Ethernet frame generator, in response to the user channel selection, to encapsulate the MPEG stream corresponding to the digital broadcast channel selected by the user in the Ethernet frame for the digital broadcast channel and to include the user's address as a destination address.

2. The digital broadcast system of claim 1, wherein the ONU comprises:
    a data separator which receives a signal input to the ONU and separates the signal into an Ethernet frame for data service and an Ethernet frame for digital broadcast service;
    the Ethernet switch which transmits the Ethernet frame for data service to the optical network terminal (ONT) provided in the user's home according to header information of the Ethernet frame for data service; and
    a channel request processor which receives the user's channel selection request information and user identification (ID) information from the ONT.

3. The digital broadcast system of claim 2, wherein the ONU upwardly interfaces with the digital broadcast output unit on the Ethernet-passive optical network (E-PON) and downwardly interfaces with a plurality of ONTs on an Ethernet network.

4. The digital broadcast system of claim 2, wherein the data separator is a wavelength division multiplexing (WDM) filter which separates the input signal into the Ethernet frame for data service and the Ethernet frame for digital broadcast service using a WDM technique.

5. The digital broadcast system of claim 2, wherein the digital broadcast processor comprises:
    a demultiplexer which demultiplexes the plurality of Ethernet frames for digital broadcast service of different channels;
    a tuner which transmits the demultiplexed Ethernet frame corresponding to the channel selected by the user to a port dedicated for each of the ONTs based on the channel selection request information and the user ID information; and
    the Ethernet frame generator which generates the Ethernet frame for digital broadcast service having the user's address as the destination address by encapsulating the data transmitted by the tuner.

6. The digital broadcast system of claim 2, wherein the ONT is connected to a data processor which provides a data service to the user in response to the reception of the Ethernet frame for data service, and a set-top box which provides a digital broadcast service to the user in response to the reception of the Ethernet frame for digital broadcast service.

7. The digital broadcast system of claim 1, wherein the digital broadcast output unit transmits entire digital broadcast channel data to the ONU via an IP network or a leased line.

8. The digital broadcast system of claim 7, wherein the digital broadcast output unit transmits the entire digital broadcast channel data to the ONU via the IP network using a multi-protocol label switching (MPLS) technique, which is capable of guaranteeing quality-of-service (QoS).

9. An optical network unit (ONU), comprising:

a data separator which receives a signal input to the ONU and separates the signal into an Ethernet frame for data service and an Ethernet frame for digital broadcast service;

a channel request processor which receives, by using a part of bandwidth assigned for an existing line, a user's channel selection request information and user identification (ID) information from an optical network terminal (ONT) provided in the user's location;

a digital broadcast processor which receives an MPEG stream containing all of the digital broadcast channels transmitted from a remote digital broadcast output unit over an Ethernet-passive optical network (E-PON), demultiplexes a plurality of Ethernet frames corresponding to all of the of the digital broadcast channels, and transmits, in response to the user's channel selection, one of the demultiplexed Ethernet frames that is corresponding to the digital broadcast channel selected by the user, to the user's ONT; and an Ethernet switch which transmits the Ethernet frame for the digital broadcast channel selected by the user to the user's ONT according to header information of the Ethernet frame; and wherein the digital broadcast processor further comprises:

an Ethernet frame generator, in response to the user channel selection, to encapsulate the MPEG stream corresponding to the digital broadcast channel selected by the user in the Ethernet frame for the digital broadcast channel and to include the user's address as a destination address.

10. The ONU of claim 9 upwardly interfaces with the digital broadcast output unit on the Ethernet-passive optical network (E-PON) and downwardly interfaces with a plurality of ONTs on an Ethernet network.

11. The ONU of claim 9, wherein the data separator is a wavelength division multiplexing (WDM) filter which separates the input signal into the Ethernet frame for data service and the Ethernet frame for digital broadcast service using a WDM technique.

12. The ONU of claim 9, wherein the digital broadcast processor comprises:

a demultiplexer which demultiplexes the plurality of Ethernet frames for digital broadcast service of different channels; and a tuner which transmits the demultiplexed Ethernet frame corresponding to the channel selected by the user to a port dedicated for each of the ONTs based on the channel selection request information and the user ID information.

13. The ONU of claim 9, wherein the ONT is connected to a data processor which provides a data service to the user in response to the reception of the Ethernet frame for data service, and a set-top box which provides a digital broadcast service to the user in response to the reception of the Ethernet frame for digital broadcast service.

* * * * *